(12) United States Patent
Ryzl

(10) Patent No.: US 7,155,381 B2
(45) Date of Patent: Dec. 26, 2006

(54) MODULE FOR DEVELOPING WIRELESS DEVICE APPLICATIONS USING AN INTEGRATED EMULATOR

(75) Inventor: Martin Ryzl, Prague (CZ)

(73) Assignee: Sun Microsystems, Inc., Santa Clara, CA (US)

( * ) Notice: Subject to any disclaimer, the term of this patent is extended or adjusted under 35 U.S.C. 154(b) by 809 days.

(21) Appl. No.: 09/803,835

(22) Filed: Mar. 12, 2001

(65) Prior Publication Data

US 2002/0169591 A1    Nov. 14, 2002

(51) Int. Cl.
G06F 9/455 (2006.01)
G06F 9/44 (2006.01)
G06F 3/00 (2006.01)
G06F 9/00 (2006.01)
G06F 17/00 (2006.01)

(52) U.S. Cl. .................. 703/24; 717/134; 715/864; 715/961

(58) Field of Classification Search .......... 703/23, 703/24; 368/10; 455/412.2, 560, 426.2, 455/554.2; 717/134; 715/864, 961
See application file for complete search history.

(56) References Cited

U.S. PATENT DOCUMENTS

| | | | |
|---|---|---|---|
| 5,485,569 A | 1/1996 | Goldman et al. | |
| 5,600,790 A * | 2/1997 | Barnstijn et al. | 714/38 |
| 5,666,399 A | 9/1997 | Bales et al. | |
| 5,794,049 A | 8/1998 | Lindholm | |
| 5,852,733 A | 12/1998 | Chien et al. | |
| 6,167,253 A * | 12/2000 | Farris et al. | 455/412.2 |
| 6,167,564 A | 12/2000 | Fontana et al. | 717/1 |
| 6,198,945 B1 * | 3/2001 | Chen et al. | 455/560 |
| 6,282,152 B1 * | 8/2001 | Kurple | 368/10 |
| 6,681,243 B1 | 1/2004 | Putzolu et al. | |
| 2002/0087300 A1 * | 7/2002 | Patwari | 703/22 |
| 2002/0103881 A1 * | 8/2002 | Granade et al. | 709/218 |
| 2003/0236657 A1 * | 12/2003 | Ryzl | 703/23 |

OTHER PUBLICATIONS

"i-mode Java Content Developer's Guide" -Functional Descriptions- Release 1.1, May 14, 2000 NTT DoCoMo, Inc., 103 pages.*
"JavaGrande and JavaOne 99 Highlights" by CrossRoads Technologies, Inc. 1998, 1999 Version 1.2, pp. 1-19.*
Derek Rayside, Evan Mamas, Erik Hons, "Compact Java Binaries for Embedded Systems" University of Waterloo, Onterio, Canada, Sep. 13, 1999, pp. 1-14.*
J2ME Building Blocks for Mobile Devices, Sun Microsystems, May 19, 2000, 42 pages.*

* cited by examiner

Primary Examiner—Paul Rodriguez
Assistant Examiner—Dwin McTaggart Craig
(74) Attorney, Agent, or Firm—Osha Liang LLP

(57) ABSTRACT

An apparatus for facilitating development of an application for a wireless-connected device including a module have a plurality of development tools for use in the creation of the application and an emulator of the wireless-connected device integrated with the module. An additional emulator for an additional wireless-connected device is also included. The module may be included in an Integrated Development Environment.

19 Claims, 18 Drawing Sheets

MODULE FOR DEVELOPING WIRELESS DEVICE APPLICATIONS USING AN INTEGRATED EMULATOR

FIELD OF THE INVENTION

This invention relates to the field of software development tools utilizing integrated emulators for developing applications. The applications are written to execute on mobile, wireless-connected devices.

BACKGROUND OF THE INVENTION

The basic functionality of a computer is dictated by the type of operating system it uses. Various operating systems exist in the market place, including Solaris™ from Sun Microsystems Inc., Palo Alto, Calif. (Sun Microsystems), MacOS® from Apple Computer, Inc., Cupertino, Calif., Windows® 95/98 and Windows NT®, from Microsoft Corporation, Redmond, Wash., and Linux. The different types of operating systems will be referred to herein as "platforms". Prior to the popularity of the Internet, software developers wrote programs specifically designed for individual platforms. Thus, a program written for one platform could not be run on another. However, the advent of the Internet made cross-platform compatibility a necessity.

Prior art FIG. 1 illustrates a conceptual arrangement wherein a first computer (3) running the Solaris™ platform and a second computer (5) running the Windows® 98 platform are connected to a server (9) via the internet (7). A resource provider using the server (9) might be any type of business, governmental, or educational institution. The resource provider has a need to be able to provide its resources to both the user of the Solaris™ platform and the user of the Windows® 98 platform, but does not have the luxury of being able to custom design its content for the individual platforms.

The Java™ programming language was developed by Sun Microsystems to address this problem. The Java™ programming language was designed to be simple for the programmer to use, yet able to run securely over a network and work on a wide range of platforms.

Referring to FIG. 2, in order to create a Java™ application, the developer first writes the application in human-readable Java™ source code. As used herein, the term "application" refers to Java™ 2 Standard Edition (J2SE™) applications, Java™ 2 Micro Edition (J2ME™), and Java™ "applets" which are essentially small applications usually embedded in a web page. In the example shown, the application "Program" (11) is created as a human-readable text file. The text file contains Java™ language commands, e.g. "import java.awt.frame." The name of this text file is given the required five-character extension ".java".

The Java™ compiler ("javac", "fastjavac", "jvc", et. al.) (13) is used to compile the source code into a platform independent bytecode (15). Compilation of J2ME™ applications is slightly different than for J2SE™. The J2ME™ compilation process adds a pre-verification step after the bytecode (15) is generated. This final step produces a pre-verified bytecode. Using either method of compilation, the resulting binary file (15) will automatically receive the same file name as the source text file with ".class" extension or the same name of the source file plus a special character "$" plus the name of an inner class with the extension ".class."

The Java™ runtime environment incorporates a virtual machine (16) to verify whether a given bytecode (15) has the proper format (verification process) and convert the ".class" byte codes into actual machine executions (17). The machine executions (like drawing windows, buttons, and user prompt fields) will occur in accordance to the application developer's code instructions. Because Sun Microsystems specifically designed the virtual machine (16) to run on different platforms, a single set of ".class" byte codes will execute on any platform where a virtual machine (16) has been installed. An Internet browser such as Netscape® and Microsoft® Internet Explorer that incorporates a virtual machine (16) is called a "java-enabled" browser. A discussion of the Java™ language itself is beyond the scope of this document. However, complete information regarding the Java™ programming language and the Java™ platform are available from Sun Microsystems in print.

The cross-platform architecture of the Java™ programming language is illustrated in FIG. 3, which shows how the Java™ language enables cross-platform applications over the Internet. In the figure, the computer (3) running the Solaris™ platform and the computer (5) running the Windows® 98 platform are both provided with the virtual machine (16). The resource provider creates a Java™ application using the Java™ software development kit ("SDK") (23) and makes the compiled Java™ byte codes available on the server (9), which in this example is running on a Windows NT® platform. Through standard Internet protocols, both the computer (3) and the computer (5) may obtain a copy of the same byte code and, despite the difference in platforms, execute the byte code through their respective virtual machine (16).

As the popularity of the Internet has increased, users have become accustomed to many different types of interfaces. Thus, aesthetic conformity has become less of an issue. At the same time, speed, functionality, and versatility have become increasingly important. Therefore, the J2SE™ SDK includes a new "package" for the developer called "swing" that is essentially library of "lightweight components". This new package is simply one library that is possible; other libraries may be created and in fact are available from third parties. Swing provides the developer with the option and flexibility to use lightweight. A detailed discussion of the Swing package is beyond the scope of this document. Complete documentation is available from Sun Microsystems both in print and at the web site java.sun.com.

Forte for Java™ products derived from NetBeans™ Open Source Project, are visual programming environments written entirely in Java™ and Swing. These products are commonly regarded as Integrated Development Environment (IDE). This IDE is easily customizable and extensible, as well as platform independent. As is illustrated in FIG. 5, Forte™ for Java™ includes a powerful Form Editor (92), integrated full-featured text editor (94), debugger (98), compiler (100), etc. Forte™ for Java™ is also completely modular and is built around a set of Open Application Programming Interface (API's) which allow the IDE to be easily extensible. This means that the IDE functionality for editing, debugging, GUI generation, etc. is represented in modules that can be downloaded and updated dynamically as is illustrated in FIG. 5. Instead of waiting months for a completely new release, as soon as new versions (104) or new modules (106) are available, users can update that individual version or module via the Update Center (102) or from other vendors.

With an increase in popularity of mobile, wireless-connected devices (like cellular phones, personal digital assistants, point of sale terminals, two-way pagers or any other device constrained in processing power, memory and graphical capability), the release of J2ME™ technology (50) has emerged. J2ME™ is the edition of Java™ 2 platform that targets consumer electronics and embedded devices. J2ME™ technology (50) allows the use of applications that are on these devices targeted at satisfying consumer market demand for wireless access to at-your-fingertips information, service, and entertainment (e.g., sport scores, financial information, e-commerce, games, interpersonal communication, etc.). This J2ME™ technology provides a standard platform for small, resource-limited, wireless-connected mobile information devices.

In addition to being wireless-connected, these mobile information devices have small displays, low bandwidth, high latency network connections, limited input devices, limited local storage, battery life and processor power. These devices may be roughly divided into two categories: devices that are mostly mobile, and devices that typically remain fixed. The hardware and network resources available to mobile devices tend to be more limited than in the case of devices with an ample supply of wall-power. Conversely, devices with easy access to power and wired network connections can take advantage of the wires to provide more power and sophistication to the user. Recognizing this distinction, the J2ME™ technology (50) consists of the virtual machine (16) and set of APIs suitable for providing tailored runtime environments for consumer and embedded electronics.

J2ME™ technology (50) as depicted in FIG. 6 has two primary kinds of components—a configuration (38) and a profile (54). The configuration (38) is the combination of a virtual machine (any virtual machine that is at least as capable as a Sun Microsystems K virtual machine (KVM)) and "core" APIs (52) that represent an underlying development platform for a broad class of devices. Configurations (38) are nestable, so that any software able to execute on a less capable configuration is able to execute on a more capable one. At present, two accepted configurations (38) are a Connected Device Configuration (CDC) and a J2ME™ Connected Limited Device Configuration (CLDC) (39). The CDC is a more robust configuration that allows any software to be able to execute on larger, fixed hardware. The design center for smaller handheld devices is addressed by the CLDC (39). The CLDC (39) specification outlines the most basic set of libraries and virtual machine features (16) that must be present in each implementation of a J2ME™ environment on highly constrained devices. To form a complete environment for any given class of device, manufacturers add additional libraries, that address API areas not dealt with in the low-level CLDC (39), such as user interface and device-specific networking.

The heart of the CLDC (39) and J2ME™ technology (50) in mobile devices is KVM. The KVM is a virtual machine designed from the ground up with the constraints of inexpensive mobile devices in mind. It is highly optimized for very resource-constrained consumer devices. Named to reflect that its size is measured in the tens of kilobytes, the KVM is suitable for devices with 16/32-bit RISC/CISC microprocessors/controllers, and with as little as 160 K of total memory available, of which 128 K is for the storage of the KVM and libraries themselves. Like all virtual machines (16), the KVM provides the foundation for the download and execution of dynamic content and services.

Like a standard virtual machine (16), a KVM supporting CLDC (39) must be able to reject invalid classfiles. However, since the static and dynamic memory footprint of the standard Java™ classfile verifier is excessive for a typical CLDC (39) target device, a more compact and efficient verification solution has been created. The implementation of the new verifier in the KVM requires about ten kilobytes binary code and less than 100 bytes of dynamic RAM at runtime for typical class files. The verifier performs only a linear scan of the bytecode (15), without the need of a costly iterative dataflow algorithm. The new verifier requires Java classfiles to contain a special attribute. The new verifier includes a pre-verification tool that inserts this attribute into normal class files. A transformed class file is still a valid J2SE™ class file, with additional attributes. These attributes are automatically ignored by the conventional classfile verifier, so the solution is fully upward compatible with the J2SE™ virtual machine (16).

The profile (54) is a set of original equipment manufacturer (OEM) specific APIs (34) built on top of and utilizing an underlying configuration (38), necessary to provide a complete runtime environment for a specific kind of device. The profile (54) must be complete in the sense that an application written to the specification can execute in the specified Java™ technology environment without the addition of other Java™ classes. The profile (54) can be thought of as selecting classes from APIs to form a complete environment. The profile (54) is designed and integrated to meet the needs of specific industry segments. At present, two J2ME™ wireless profiles exist: 1) Mobile Information Device Profile (MIDP) (30) and 2) DoJa, which is a proprietary profile developed by NTT DoCoMo similar to MIDP (30).

The MIDP (30) is a set of Java™ APIs which, together with the CLDC (39), provides a complete J2ME™ application runtime environment targeted at mobile information devices, such as cellular phones and two-way pagers. A diagram showing the relationship between MIDP (30), CLDC (39), OEM specific APIs (34) and MIDP applications (36)/OEM applications (34) running on different platforms (40) is shown in FIG. 7. The MIDP specification addresses issues such as user interface, persistence storage, networking, and application model. The MIDP specification also provides a standard runtime environment that allows new applications and services to be dynamically deployed on end user devices.

Any J2ME™ wireless application may be in the form of an MIDP applications (36) or an OEM application (34). However, as is shown in FIG. 8, the applications are not totally different. A J2ME™ wireless application consists of two files, namely a jar file (58) and an application descriptor (60). The jar file (58) contains the MIDP application (36) itself. The application descriptor (60) contains information such as the name of the application, location of the jar file, and main class. The IDE uses the same user interface for both types of the applications, but the format of the file that is used for storing and checking of values depends on type of the application.

SUMMARY OF INVENTION

In one aspect, the invention comprises an apparatus for facilitating development of an application for a wireless-connected device. The application is created by the use of a module having a plurality of development tools. The module is integrated with an emulator of the wireless-connected device that in an embodiment is designed to execute the application. In an embodiment, the module is integrated with an additional emulator for an additional wireless device. In an embodiment, the module is included in an Integrated Development Environment (IDE) and the module is accessible through a drop-down menu in the IDE. In an embodiment, the module is designed to allow creation and packaging of the application with a plurality of profiles without modification of the module.

In another aspect, the invention comprises an apparatus for facilitating development of an application for a wireless-connected device including a module integrated with an emulator of the wireless-connected device, a means for executing the application on the emulator of the wireless-connected device, and a means for creating and packaging the application with a plurality of profiles without modification of the module. In an embodiment, the module is included in an IDE. In an embodiment, the module comprises a plurality of development tools used in the creation of the application executed on an integrated emulator of the wireless-connected device. In an embodiment, the module is integrated with a plurality of emulators for a plurality of different wireless-connected devices.

In another aspect, the invention comprises a computer system for facilitating development of an application for a wireless-connected device. The computer system has a storage element comprising a module. The module stores a plurality of development tools. A processor and an input device creates the application using the module. An emulator is integrated with the module stored on the storage element using the processor to execute the application on the emulator of the wireless-connected device. In an embodiment, the module is integrated with an additional emulator for an additional wireless device. The module is designed to allow creation and packaging of the application with a plurality of profiles without modification of the module. In an embodiment, a computer monitor adapted to display the application and the integrated emulator of the wireless-connected device is included in the computer system. In an embodiment, the module is included in an IDE accessible through a drop-down menu.

Other aspects and advantages of the invention will be apparent from the following description and the appended claims.

DETAILED DESCRIPTION

Figure 1:
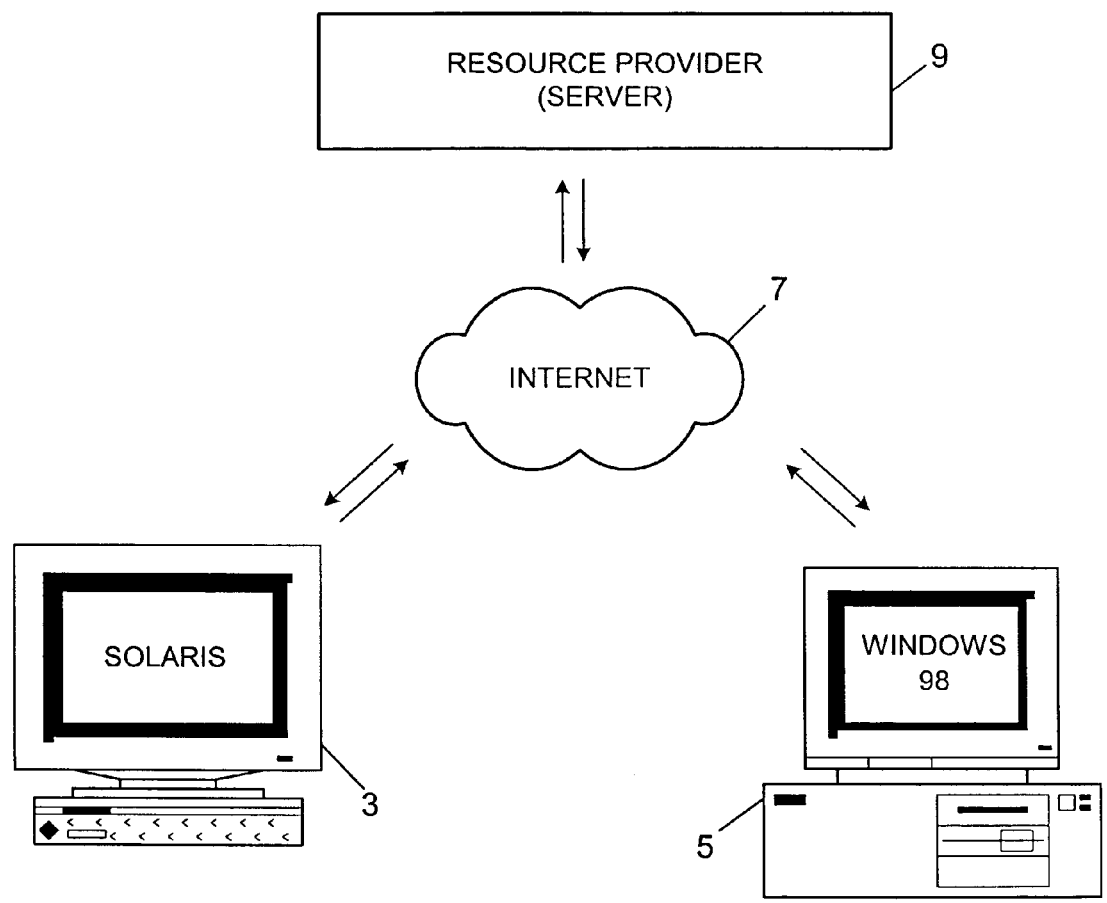
FIG. 1 illustrates a multiple platform environment.
Figure 2:
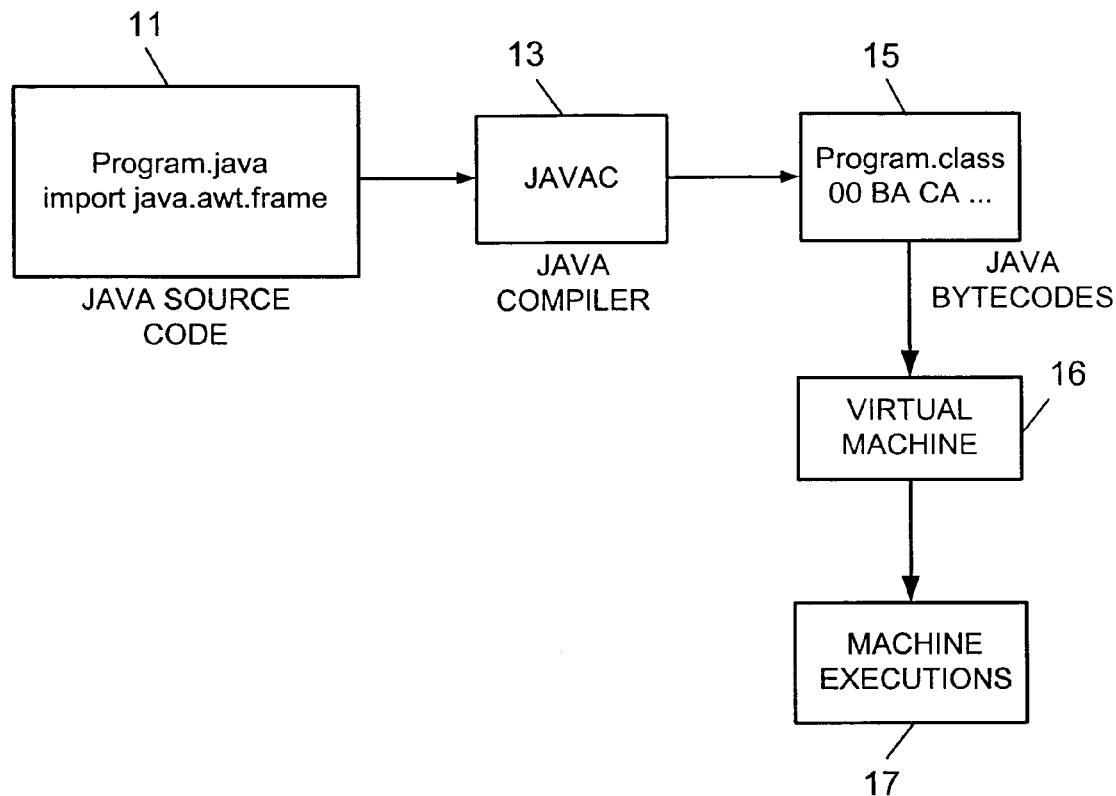
FIG. 2 illustrates a mechanism for creating Java™ applications.
Figure 3:
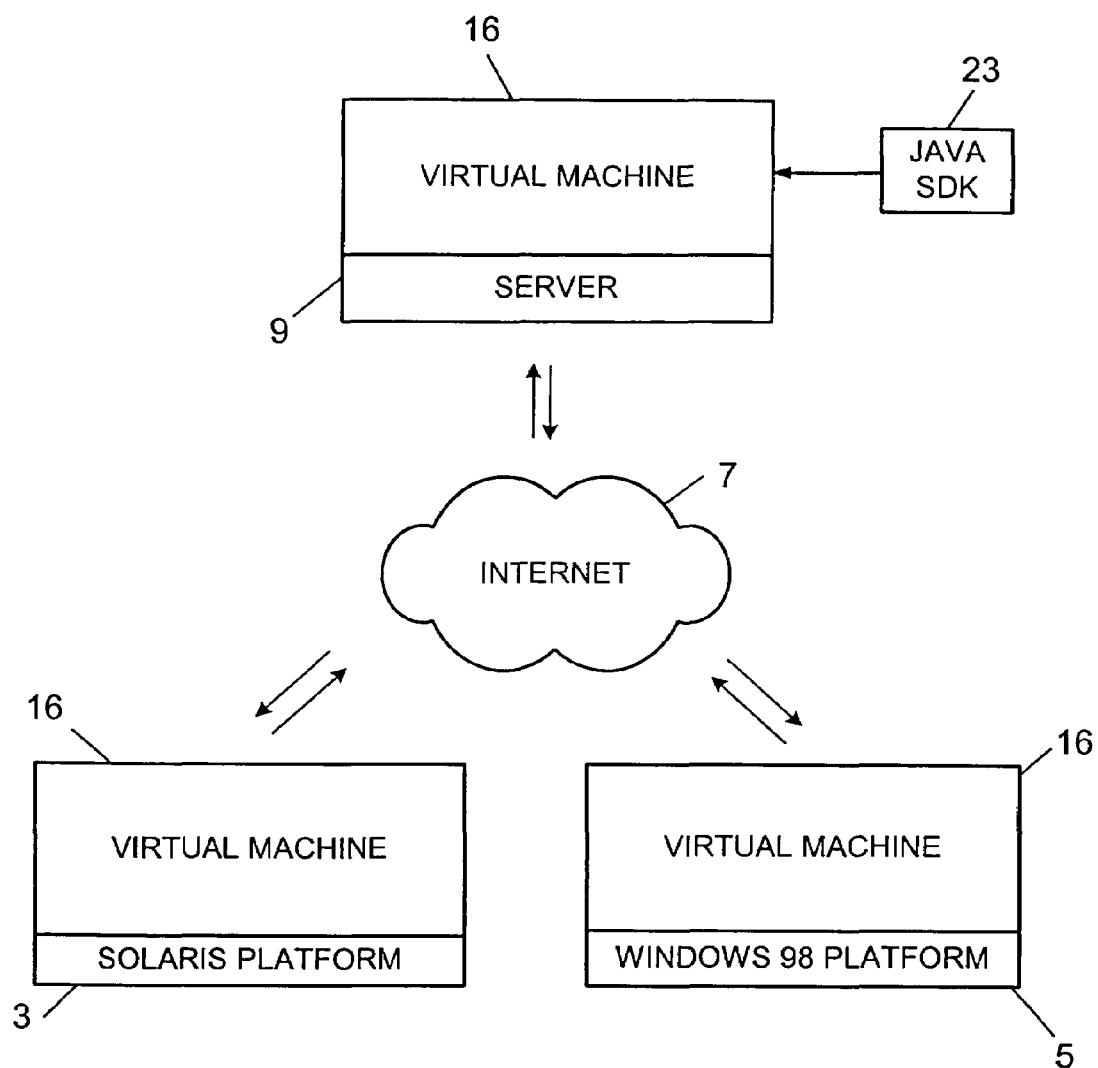
FIG. 3 illustrates a Java™ application running in a multiple platform environment.

Specific embodiments of the invention will now be described in detail with reference to the accompanying figures. Like elements in the various figures are denoted by like reference numerals for consistency.

Figure 4:
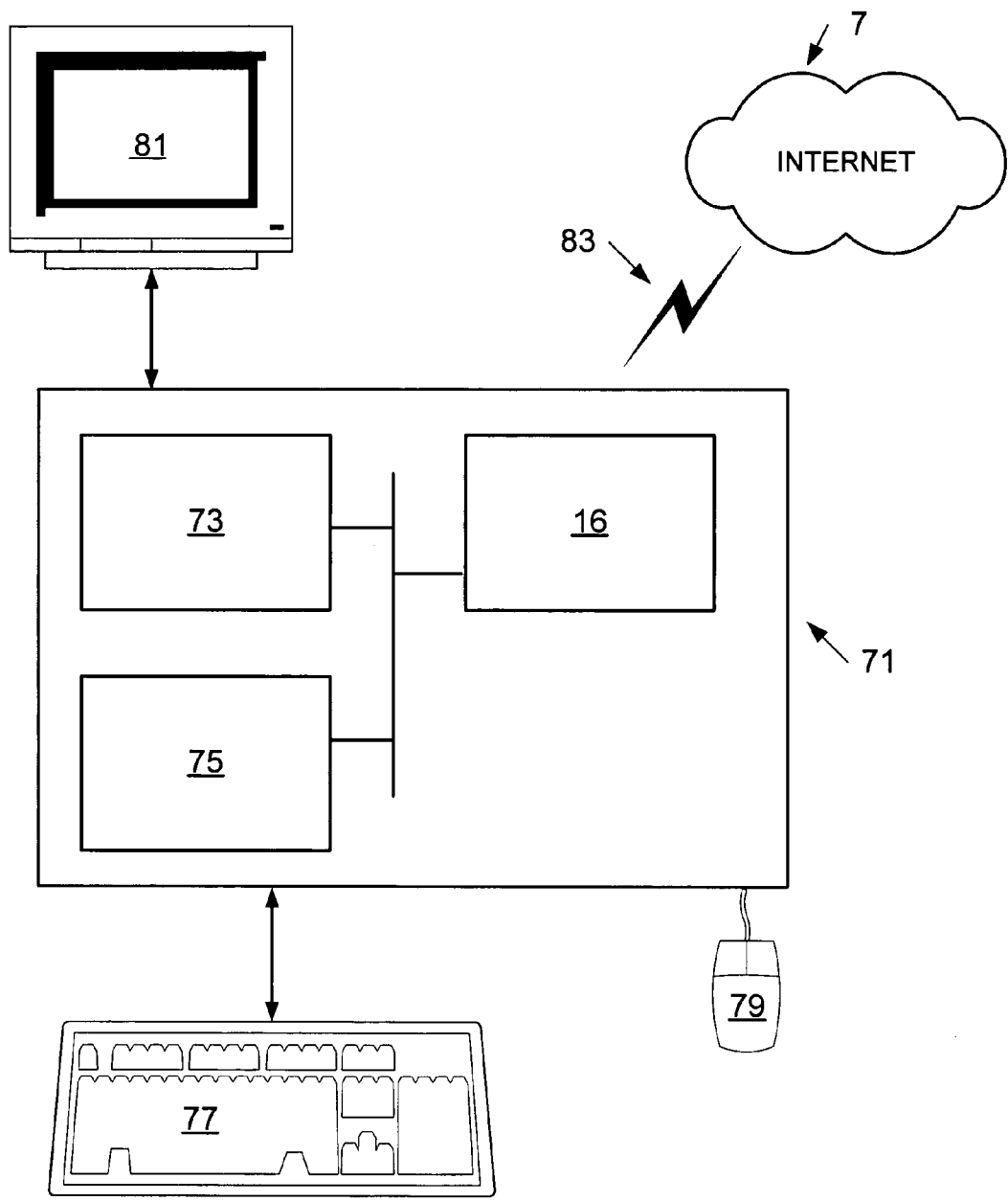
FIG. 4 illustrates a typical computer with components relating to the Java™ virtual machine.
Figure 5:
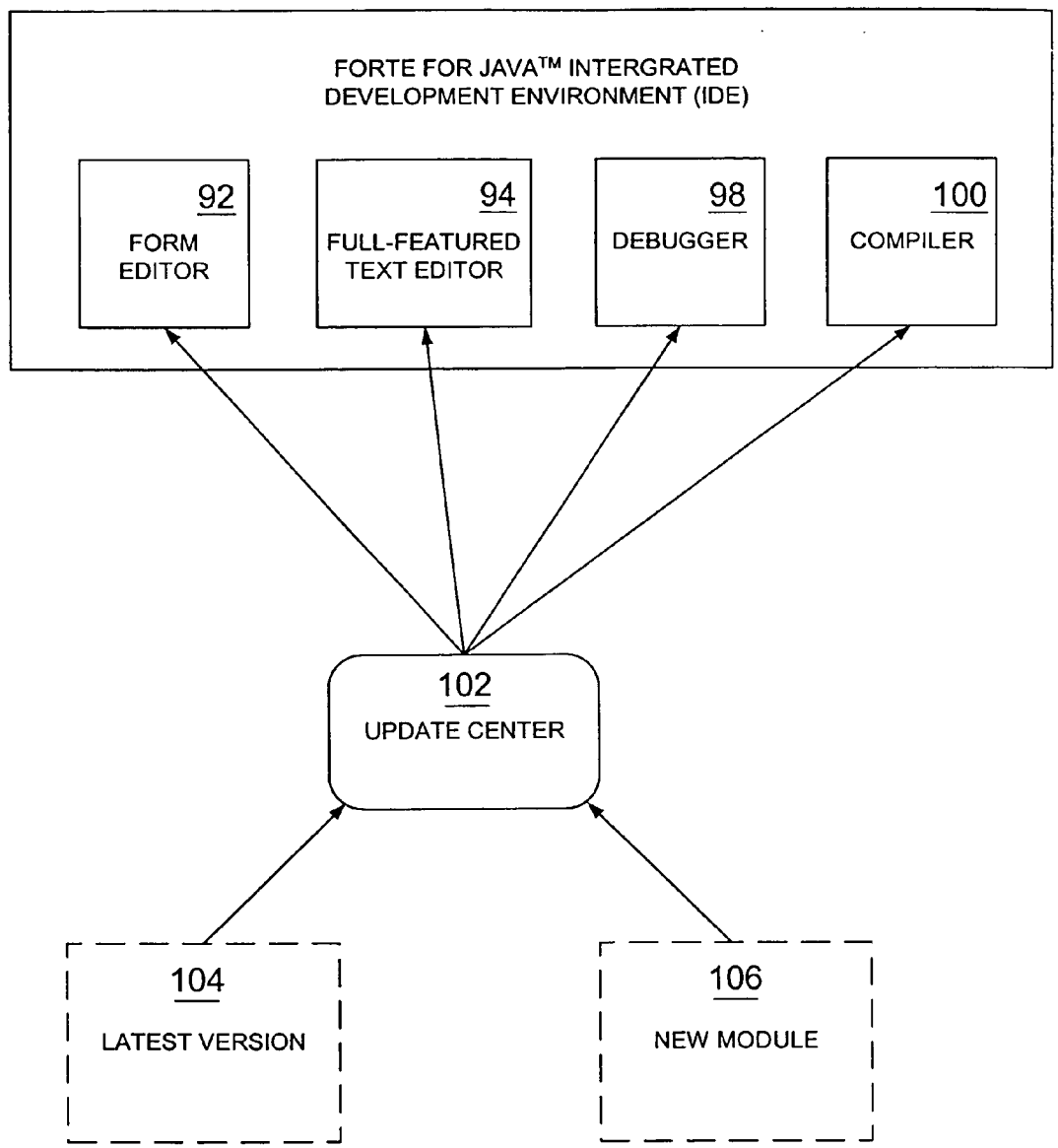
FIG. 5 illustrates a Forte™ for Java™ Integrated Development Environment (IDE).
Figure 6:
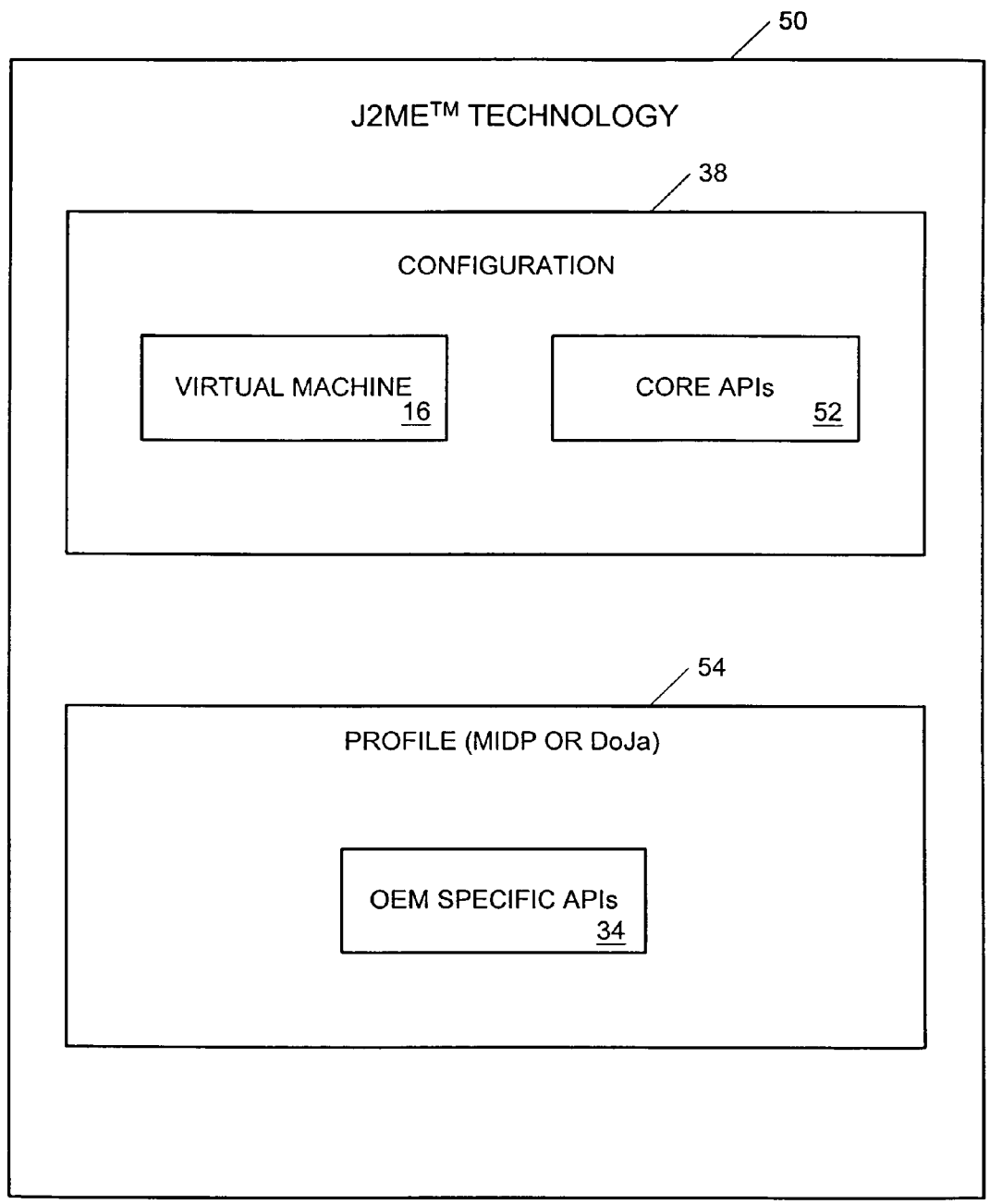
FIG. 6 illustrates a block diagram of the components of J2ME™ technology.
Figure 7:
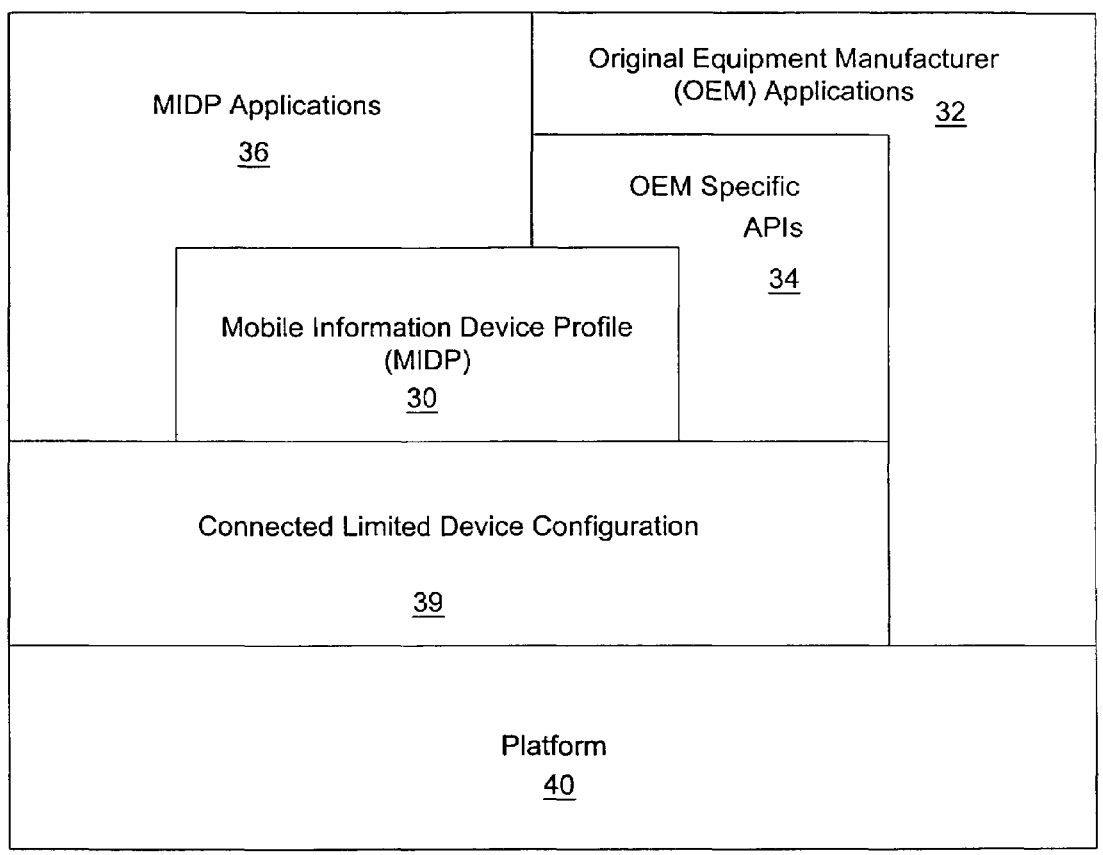
FIG. 7 illustrates a block schematic of Java™ 2 Micro Edition (J2ME™) technology.
Figure 8:
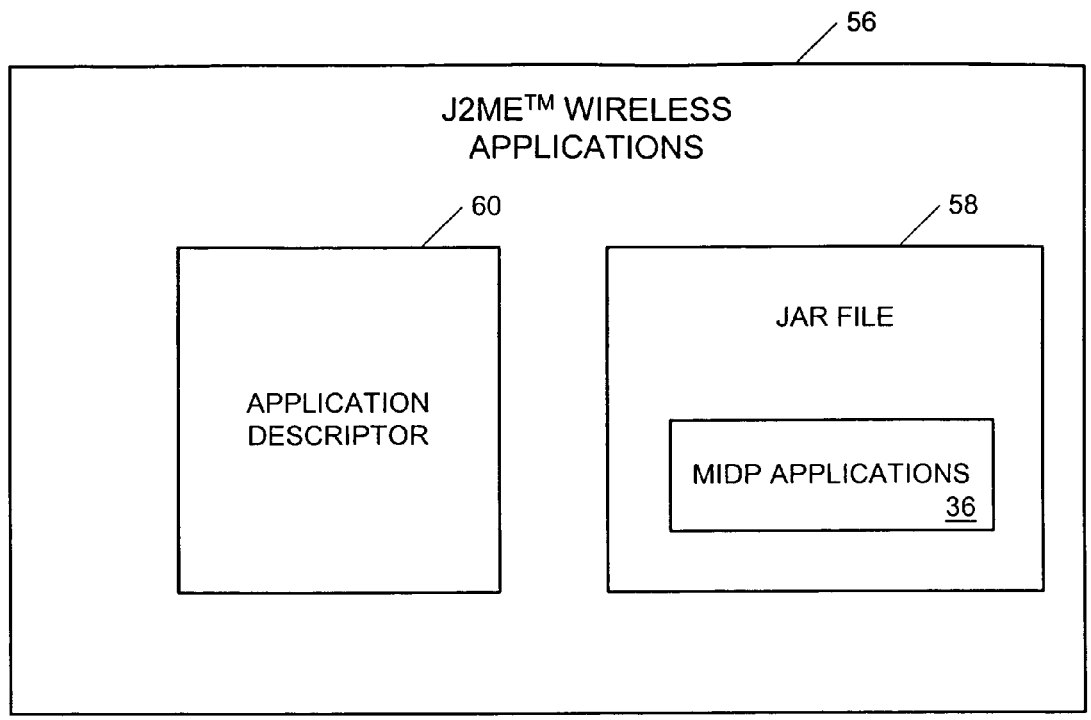
FIG. 8 illustrates a block diagram of the components of J2ME™ applications.

The invention described here may be implemented on virtually any type computer regardless of the platform being used. For example, as shown in FIG. 4, a typical computer (71) has a processor (73), associated memory (75), and numerous other elements and functionalities typical to today's computers (not shown). The computer (71) has associated therewith input means such as a keyboard (77) and a mouse (79), although in an accessible environment these input means may take other forms. The computer (71) is also associated with an output device such as a display (81), which may also take a different form in an accessible environment. Computer (71) is connected via a connection means (83) to the Internet (7). The computer (71) is configured to run a virtual machine (16), implemented either in hardware or in software.

Development of applications for CLDC (39) target, wireless-connected devices is typically done on a different platform than the J2ME™ technology (50) because the inputting and testing of applications on the small, limited devices is tedious. Ideally, an IDE (91), such as Forte™ for Java™ is used to develop applications for CLDC (39) target, wireless-connected devices. The multi-threaded IDE (91) provides editing, compilation, packaging, and execution of an application.

Figure 9:
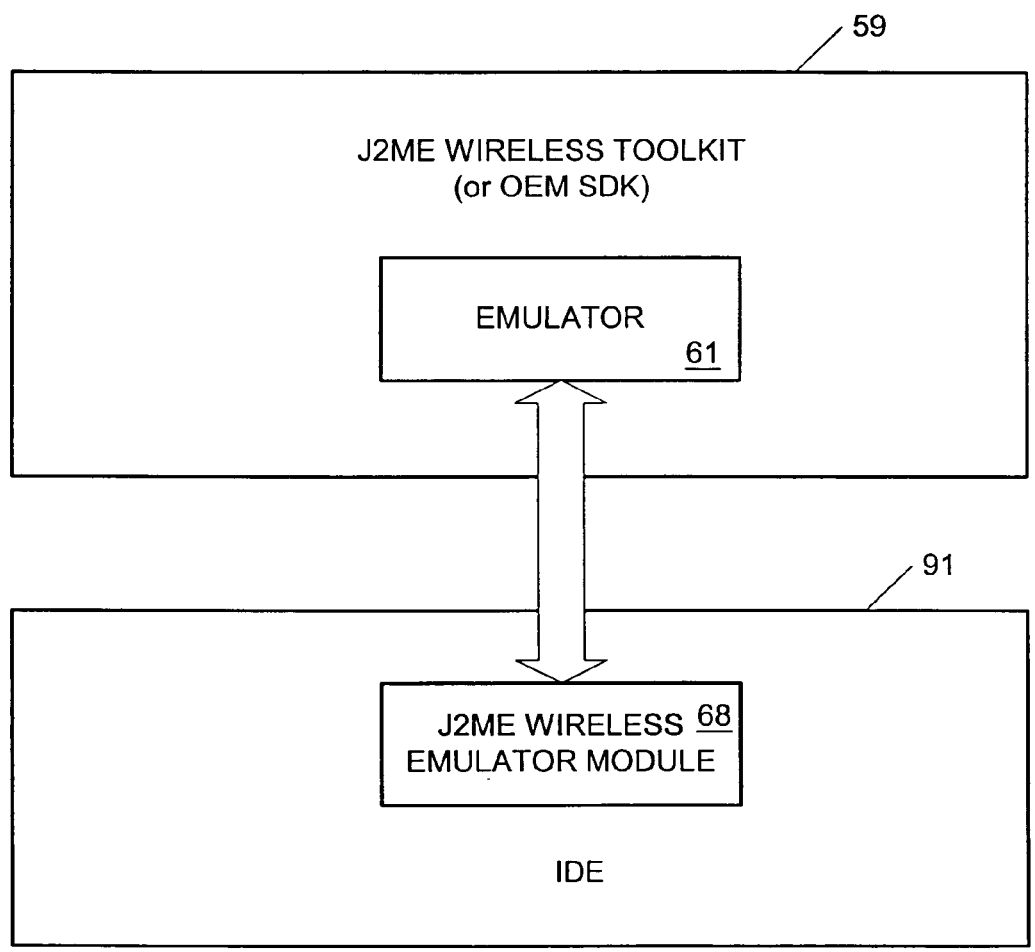
FIG. 9 illustrates a block diagram of the interface between an IDE and a J2ME™ Wireless Toolkit module in accordance with one embodiment of the invention.

Referring to FIG. 9, J2ME™ specific compilation and packaging is provided by a J2ME™ Wireless Emulator Module (68) for the IDE (91). Execution is done in an external emulator (61) and the module (68) provides a bridge to the emulator (61). The emulator (61) is used to test applications and is executed in the same virtual machine (16) as the IDE (91). The three main features of the module (68) are: (1) a pluggable architecture where it is possible to add a new implementation of the emulator (61) by a third party or a manufacturer for wireless-connected devices; (2) an ability to configure and run with different implementations of the emulator (61); and (3) an ability to create and to package applications developed according to different profiles (such as MIDP or DoJa) without modification of the module (68).

Figure 10:
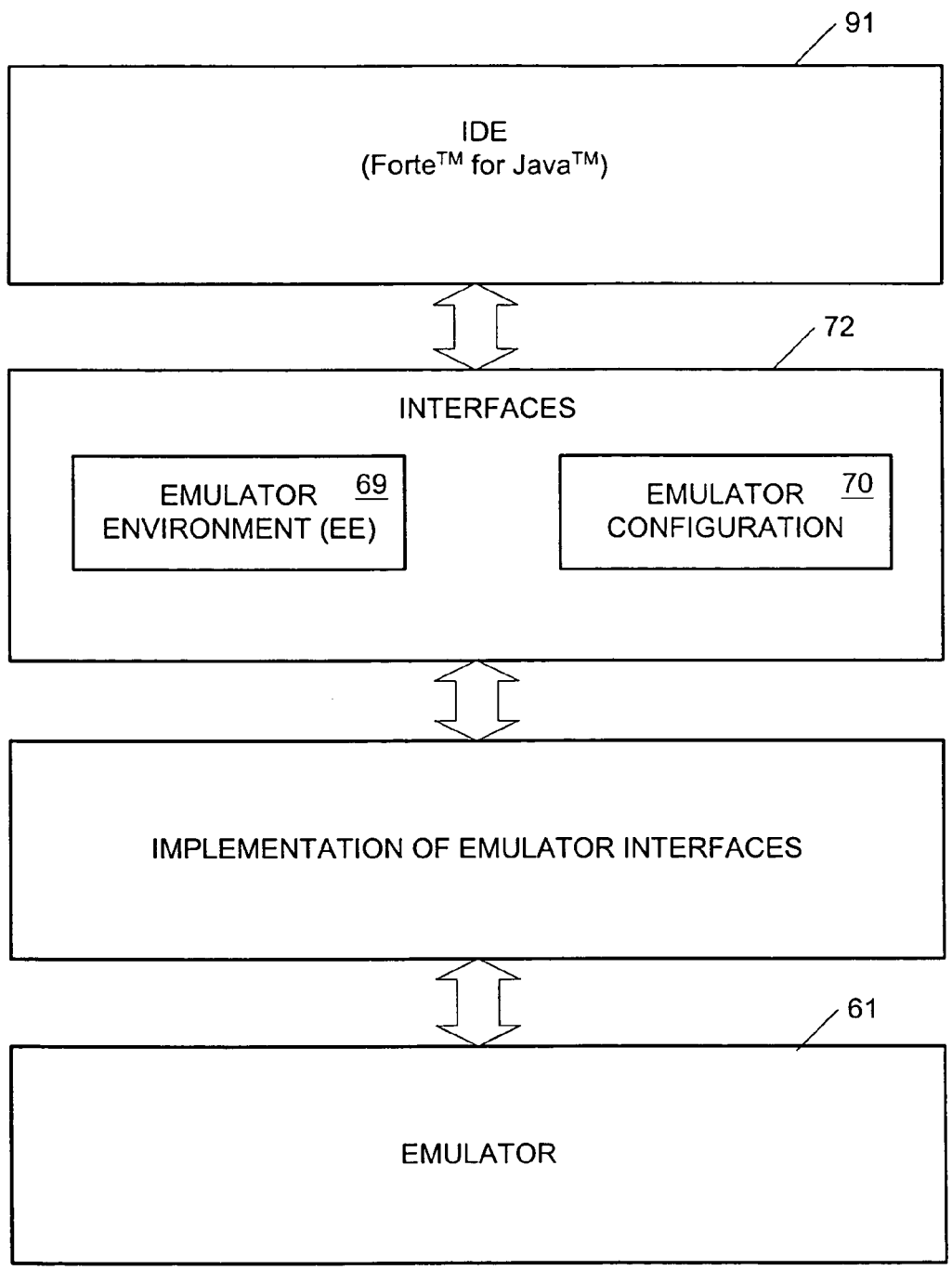
FIG. 10 illustrates a flowchart of the implementation of the Emulator interface in accordance with one embodiment of the invention.

As illustrated in FIG. 10, there are defined two interfaces for the module (68) that allow for integration between an IDE (91) such as Forte™ for Java™ and an emulator (61). A first interface is an Emulator Environment (EE) (69) that works as a factory and is used for communication with the emulator (61). The EE (69) allows for execution of an application, provides configuration beans, and provides information that is necessary for compilation of the application. Included in the information are methods that make it possible to obtain classpath configurations (e.g., path to classes defined by CLDC (39), path to classes defined by MIDP/DoJa profiles, and path to OEM specific classes). A second interface is an Emulator Configuration (70) that allows a user to change the behavior and "look and feel" of the emulator (61). The class name of the implementation of the EE (69) is specified in a special configuration file together with additional properties. The configuration is changed by using a configuration bean provided by the emulator (61). The bean is used as a parameter for the emulator's invocation. By changing the configuration of the EE (69), a classpath can be affected (the emulator can emulate different devices with different APIs). The classpath for a particular configuration is obtained by using EmulatorEnvironment.getAPIClassPath (Emulator Configuration) method.

Figure 11:
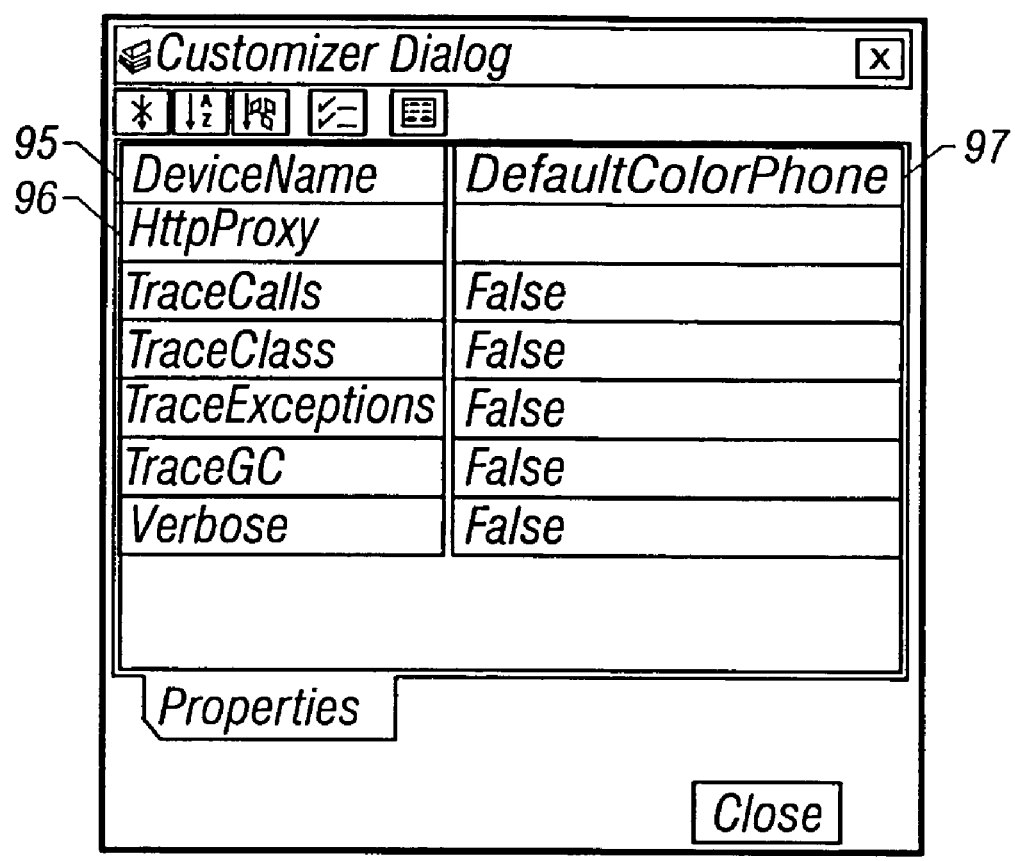
FIG. 11 illustrates a screen shot of a customizer dialog in accordance with one embodiment of the invention.
Figure 13:
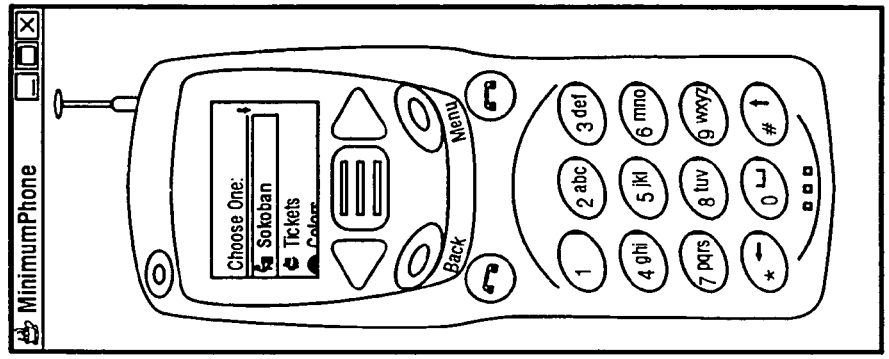
FIG. 13 illustrates a screen shot of a basic emulator in accordance with one embodiment of the invention.
Figure 12:
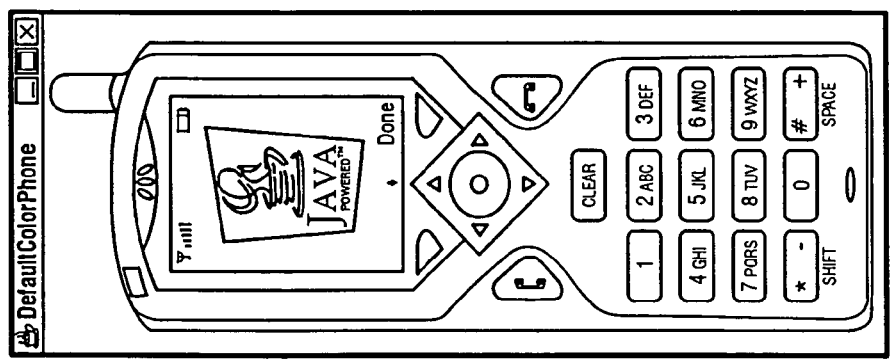
FIG. 12 illustrates a screen shot of an emulator in accordance with one embodiment of the invention.

The IDE (91), such as Forte™ for Java™, dynamically downloads the implementation and facilitates the emulator (61) to be used for execution of J2ME™ applications. An example an implementation of Emulator Configuration (70) is shown in FIG. 11 where a property httpProxy (96) is used for configuration of http proxy. 'Device Name' property (95) makes it possible to change type of device (e.g., mobile phone, pager, etc.). FIG. 12 shows the corresponding emulator look of the emulator in the case 'Device Name' property (95) has value 'DefaultColorPhone' (97). By changing 'Device Name' property (95) to value 'Minimum Phone' the emulator look changes, as is shown in FIG. 13.

When a new version of the emulator (61) is developed, implementation of a new emulator interface (EE (69) and Emulator Configuration (70)) may also be necessary. If so, once the interface is implemented, the IDE (91) is able to interface with the emulator (61). The module (68) is able to work with different application types and different profiles (54) of the J2ME™ applications in a seamless manner. It is also possible to add new/change existing types of applications without a modification of the module (68) and to create a configuration file (38) for another type of the application descriptor (60) without a necessity to change the module (68).

Following is a description of how the EE (69) is installed, configured and used in one embodiment of this invention. The EE (69) must be installed and configured prior to using the module (68) because the IDE (91) uses an emulator (61) to execute an application. However, there are various implementations (and different configuration dialogs) of the emulator (61) that differ in user interface and configuration. That is the reason for the creation of the EE (69) where the IDE (91) is able to use all different types of emulators (61) without having to recompile the module (68). Just as with module (68), the emulator (61) is executed in the same virtual machine (16) as the IDE (91). When used internally by the IDE (91), the EE (69) is configured and launched from within the IDE (91).

In one embodiment, the installation process of the EE (69) copies the module (68) (kjava.jar) to a {forte.home}/modules directory and EE interface classes (kenv.jar) to a {forte.home}/lib/ext directory. During the installation of the module (68), the installation process creates a kee.properties file in a {forte.home}/system/kjava directory. The kee.properties file contains at least the following items:

kee.tools=<location of EE tools classes> kee.emulator.class=<class that implements EE interface> kee.home=<home directory of EE> kee.preverifier=<path to preverifier process> kvem.home=<the same as kee.home—used for compatibility reasons>

The properties file is read upon the IDE (91) startup and all properties are set as system properties so the EE implementation can use them.

In one embodiment of the invention, access to the module (68) specific settings is made possible by creating a drop-down menu in the IDE (91). The project-specific settings are found under a 'Project Settings' menu heading under a menu 'J2ME Wireless Settings.' Global specific settings are found under 'Tools' menu heading under a menu 'Global Options' and a submenu 'J2ME Wireless Options'.

Figure 14:
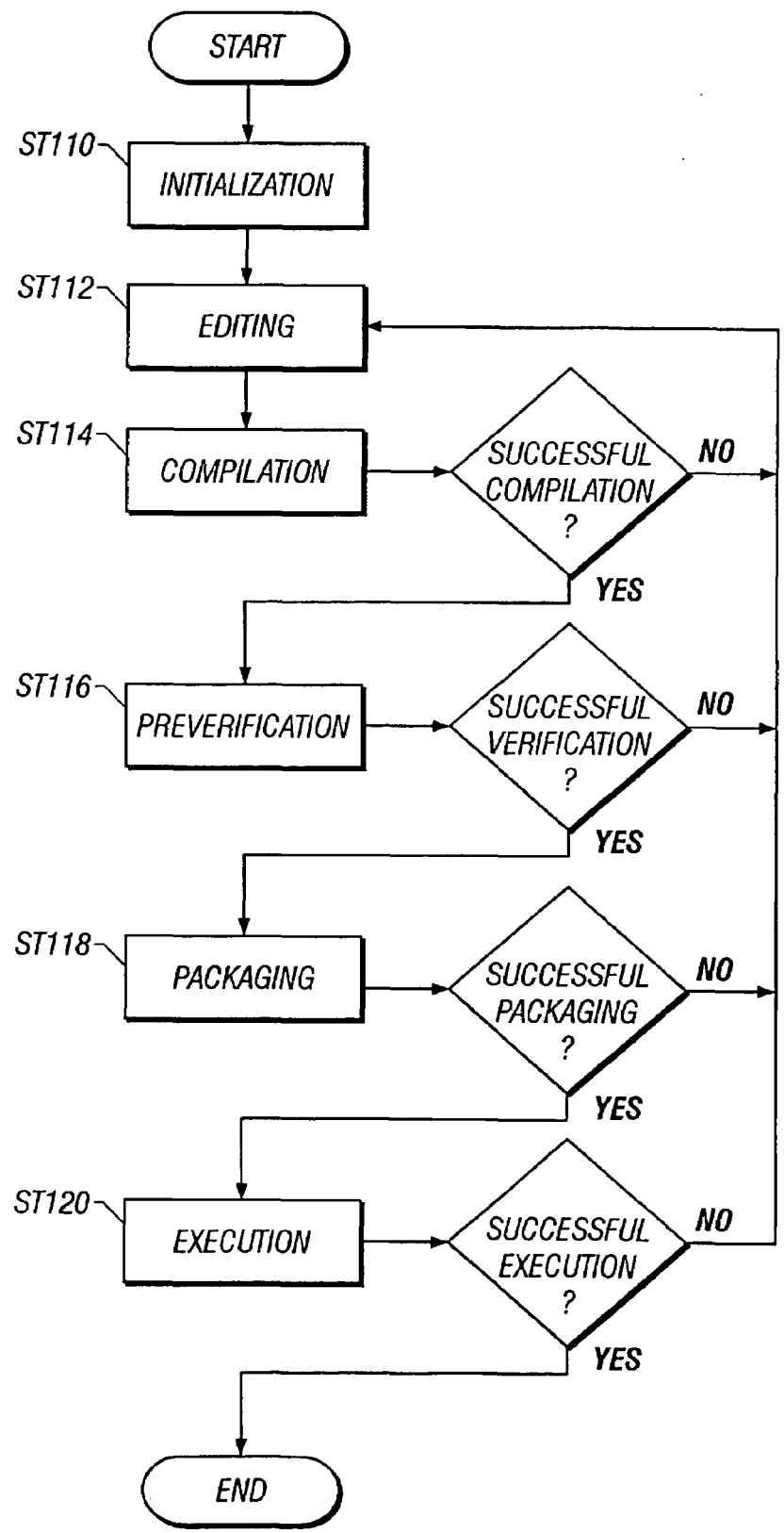
FIG. 14 illustrates a flowchart of a development cycle for J2ME applications in accordance with one embodiment of the invention.

An overview of a development cycle for programming an application for a CLDC (39) target, wireless-connected device using the module (68) is shown in FIG. 14. This overview is followed by a detailed description of the steps of the cycle. The cycle starts with an initialization process (step 110) followed by an editing step (step 112) where a human-readable text file is created and modified. Next is the compilation process (step 114). If compilation is unsuccessful, the text file should be edited and the cycle continues from the editing step (step 112). After successful compilation, the preverification process (step 116) is performed. If preverification is unsuccessful, modifications should be made and the cycle continues from the editing step (step 112). After successful preverification is performed, the next process is packaging (step 118). If packaging is unsuccessful, modifications should be made and the cycle continues from the editing step (step 112). After successful packaging is performed, the last process is execution (step 120). If execution is unsuccessful, modifications should be made and the cycle continues from the editing step (step 112).

Figure 15:
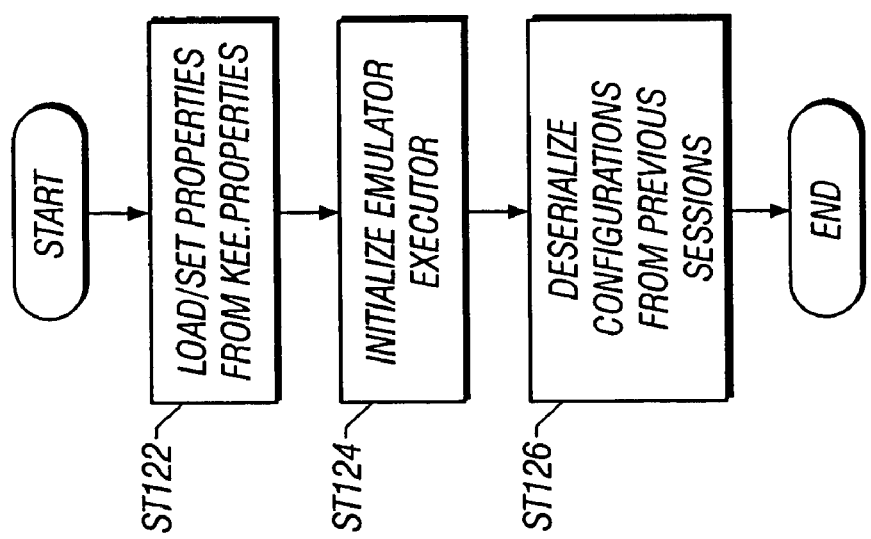
FIG. 15 illustrates a flowchart of the initialization process in accordance with one embodiment of the invention.

The initialization process (step 100) as shown in FIG. 15 starts with either loading or setting properties from kee.properties (step 122). Next, an Emulator Executor (186) is initialized (step 124) and then configurations from previous sessions (if any) are deserialized (step 126).

Figure 16:
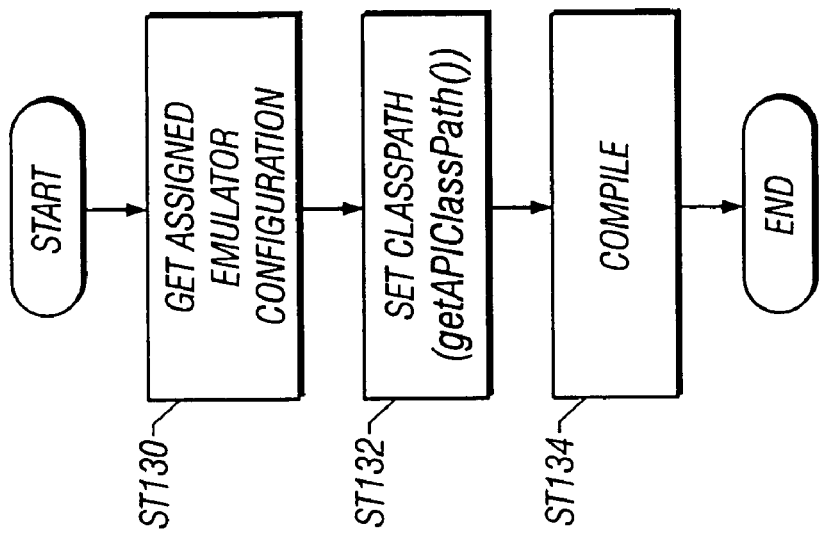
FIG. 16 illustrates a flowchart of the compilation process in accordance with one embodiment of the invention.

Referring to FIG. 16, the compilation process (step 114) begins by getting an assigned emulator configuration (step 130). Next, a classpath is set using a value obtained by getAPIClassPath( ) method (step 132). Lastly, the text file generated in the editing step (step 112) is compiled by a J2ME™ Wireless Compiler (184) (step 134). If any errors occur during the process, the process ends without successful compilation.

Figure 17:
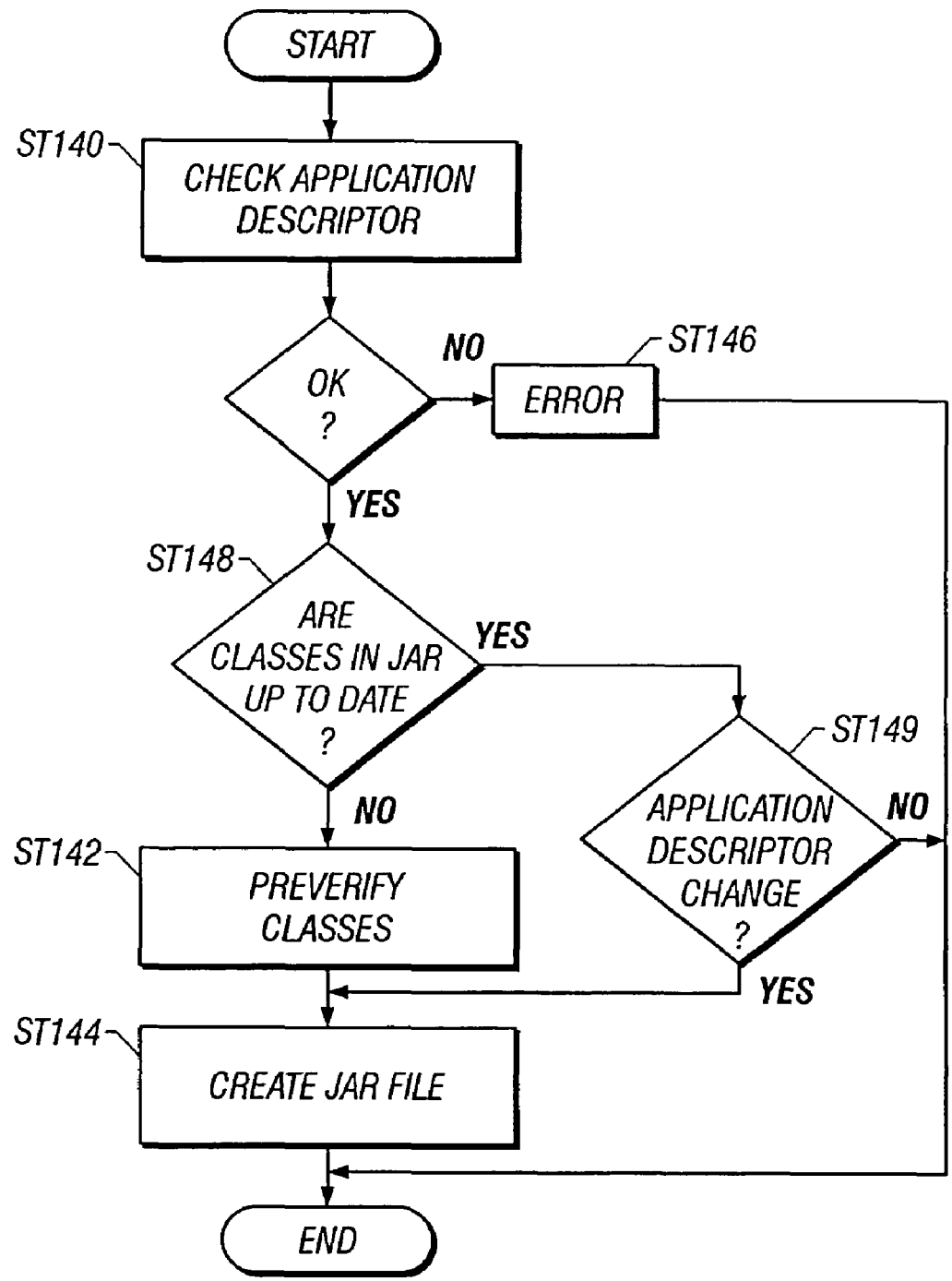
FIG. 17 illustrates a flowchart of the packaging process in accordance with one embodiment of the invention.

FIG. 17 shows the packaging process (step 118) that begins with checking the application descriptor (step 140). If the application descriptor is not proper, an error occurs (step 146) and the process ends without successful packaging. Otherwise, the next determination is if the classes in the jar file are up to date (step 148). If the classes are up to date, then another determination is made whether or not the application descriptor id has changed (step 149). If the application descriptor id changed, the classes do not need to be preverified and the next and final step is to create a jar file (step 144). If the application descriptor did not change, the packaging process is complete. If the classes are not up to date, then the next step is to preverify classes (step 142) and then the final step is to create the jar file (step 144).

Figure 18:
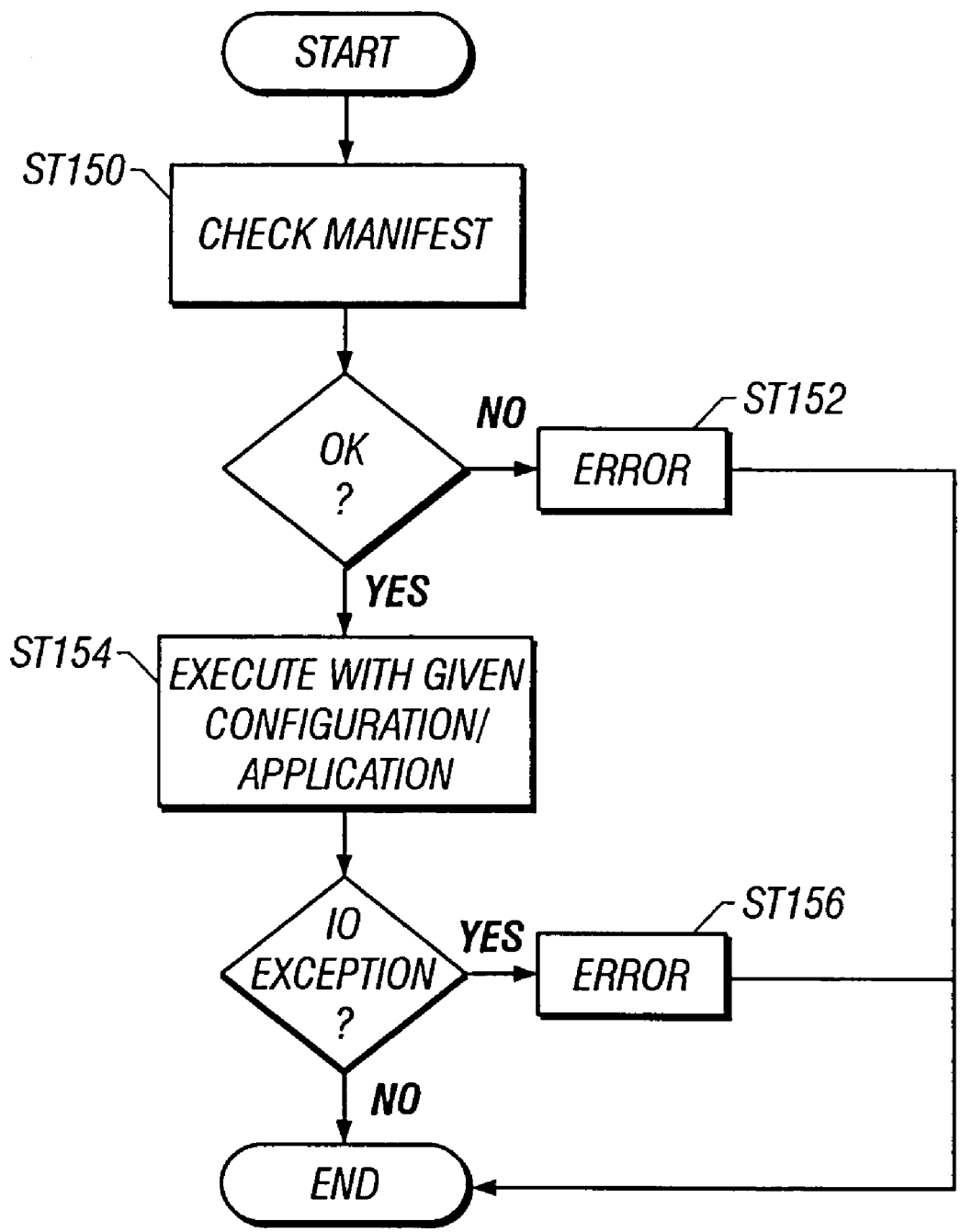
FIG. 18 illustrates a flowchart of the execution process in accordance with one embodiment of the invention.

The execution process (step 120), as shown in FIG. 18, begins with checking the manifest file (step 150). If the manifest is not proper, an error occurs (step 152) and the execution process ends without successful execution. If the manifest file is proper, the given application is executed with the given configuration (step 154). If the execution results in an input/output exception (IOException), an error occurs (step 156) and the execution process ends without successful execution. If the execution does not result in an IOException, the execution process is complete.

Figure 19:
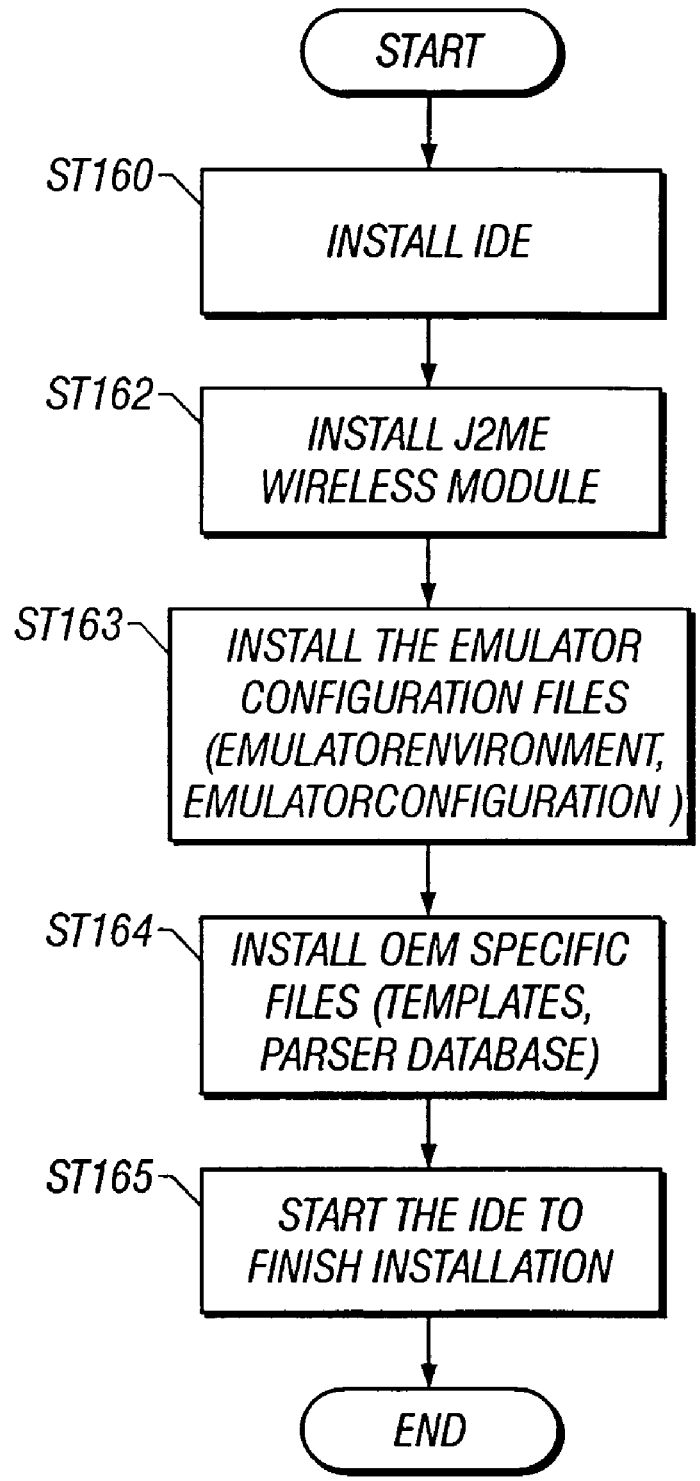
FIG. 19 illustrates a flowchart of the installation of integration components in accordance with one embodiment of the invention.

The use and support of the module (68) with the IDE (91) starts with a proper installation of the components as presented in FIG. 19. An installation process involves the following steps. First, the installation of an IDE (91) such as Forte™ for Java™ (step 160). Next, the installation of the module (68) (step 162). Next, the emulator configuration files (EE (69), Emulator Configuration (70)) are installed (step 163). Next, OEM specific files, additional templates, a parser database and examples are installed. Basic templates are part of the module (68) and are installed in the 'Templates' folder of the Forte™ for Java™ IDE during the installation of the module (68). The set of installed templates may change depending on OEM installation and customer request. Lastly, the IDE (91) is run (re-started) (step 165) to finish the installation.

The parser database is installed to ensure proper functionality and to enable an IDE code completion feature. Two possible ways of handling the parser installation of the database include copying prepared databases or to generate required databases on the fly during the installation of the module (68).

Figure 20:
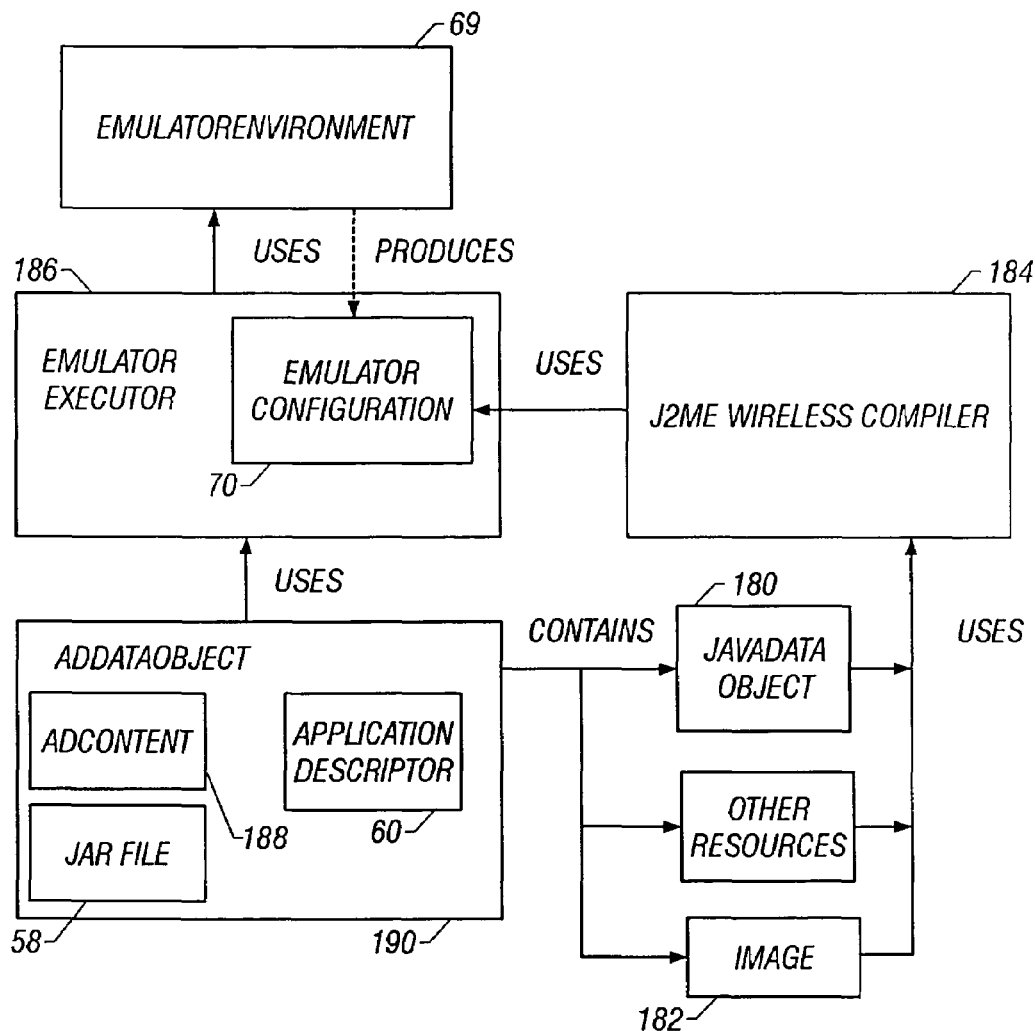
FIG. 20 illustrates a block diagram of integration of ADDataObject and JavaDataObject in accordance with one embodiment of the invention.

After the installation is complete, two data objects are integrated. The JavaDataObject (180) is integrated (174) in conjunction with the integration of a corresponding ADDataObject (190). The JavaDataObject (180), as shown in FIG. 20, is part of Java™ Module that is included in standard distribution for Forte™ for Java™. The JavaDataObject (180) covers Java™ sources and class files and displays the sources and class files as one node in an IDE Explorer. The module (68) adds some functionality to the JavaDataObject (180). The module (68) defines J2ME™ Wireless Compiler (184) which extends Internal Compiler.

J2ME™ Wireless Compiler (184) is used for compilation of classes as shown in FIG. 20.

Referring to FIG. 20, the module (68) defines Emulator Executor (186), J2ME™ Wireless Compiler (184), ADDataObject (190) and interfaces (EE (69) and Emulator Configuration (70)). Emulator Executor (186) uses EE (69) to produce the Emulator Configuration (70). Emulator Executor (186) holds exactly one Emulator Configuration (70), which may be customized. Emulator Executor (186) also uses EE (69) for execution of the application.

ADDataObject (190) represents one J2ME™ wireless project and may contain other DataObject defined by the IDE. The most typical DataObject are Java sources (JavaDataObject (180)) and images (182). ADDataObject (190) uses three files for storing information. First, an application descriptor (60) defined in MIDP or DoJa specification. Next, an application jar file (58). Third, an adContent file (188) that contains additional information that may be necessary to build the application jar file (58), e.g. a list of files that are part of a J2ME™ application, a filter (to exclude some files from the jar file (58) such as sources), compress level of the jar file, and type of application descriptor.

The adContent file uses XML format with the following structure:

```
<?xml version="1.0"?>
```

```
<AdContent version="1.0">
    <FileSystem systemName="filesystemID">
        <File name="path" />
    </FileSystem>
    <Filter common="Default" />
    <Jar compressLevel="6" compress="true" />
    <Descriptor descriptorType="jad" />
</AdContent>
```

The ADDataObject (190) appears in one node in the IDE explorer and defines four different operations. First is the open operation that allows the ability to add/remove files to the J2ME™ Wireless application, change settings of the jar file (58), and edit the application descriptor (60). Next, an update jar operation creates or updates the jar file (58). This operation covers preverification of class files, packaging and update of a manifest file and application descriptor (60) (size of jar file (58) and last modification time). Next, an execute operation that allows execution of a CLDC (39) target, wireless-connected device application. The last operation is a collection of cut, copy, paste, delete, rename, save as template, tools, and properties that operate in the usual manner expected by someone skilled in the art. The ADDataObject (190) hides all differences between DoJa, MIDP or any other possible specifications. Every type of application is described by a special Extensible Markup Language (XML) file, so ADDataObject (190) reads a configuration file within the special XML file for an appropriate type of application and then changes internal behavior to match.

Every type of application (DoJa, MIDP, other) has a separate configuration file. The name of a file is <extension of application descriptor>.xml and it is located in a{forte.home}/system/kjava directory. Currently there are two types, namely jam for DoJa and jad for MIDP. The configuration file is an XML file with the following structure:

```
<?xml version="1.0"?>
<Options version="1.0">
    <Option name="AppName" required="true" />
    . . .
    <Encoding name="SJIS_i" />
    <Delimiter char="=" />
    <Validator class="com.nttdocomo.kvem.environment.Jam-
    Validator" />
</Options>
```

Possible tags include Encoding, Delimiter, Option and Validator. Encoding is an encoding for the application descriptor. Delimiter indicates the application descriptor uses the same format as Java™ properties. However, different delimiters can be used (typically : or =). A delimiter other than the default may be specified using this element. Option describes one item of the application descriptor. Options can be marked as required (attribute required), as manifest (attribute manifest). Options can also be marked as a special option, which is generated by the module (68) (for example, the option that represents time of a last modification of a jar file). Options have assigned a special format meaning that either a format which should be used by the module when it creates an automatically generated value or a format that is required for user typed values. Validator tag may define a class that is used for a more sophisticated check of an option value. For example, the Validator can require an attribute with the name "AppName."

Advantages of developing applications using the module (68) are many. First, programming is simplified and streamlined by using the module (68) integrated with an IDE (91). The IDE (91) typically allows for development with an editing tool, compiler, de-bugger and packager in one product. The IDE (91) with the plug-in module (68) integrated with an emulator (61), adds the ability to program, observe and test applications for CLDC (39) target, wireless-connected devices in an IDE (91) without requiring downloads of applications onto a particular device to test the application. In addition, the module (68) employs a pluggable architecture where it is possible to add, configure and run a new implementation of the emulator (61) by a third party or a manufacturer for wireless-connected devices. Another advantage of using the module (68) to develop J2ME™ applications is the ability to create and to package applications developed according to different profiles (such as MIDP or DoJa) without modification of the module (68).

While the invention has been described with respect to a limited number of embodiments, those skilled in the art will appreciate that other embodiments can be devised which do not depart from the scope of the invention as disclosed herein. Accordingly, the scope of the invention should be limited only by the attached claims.

What is claimed is:

1. An apparatus for facilitating development of an application for an entire wireless-connected device, comprising:
   a module having a plurality of development tools for use in the creation of the application;
   an emulator of the entire wireless-connected device integrated with the module using an emulator environment interface and an emulator configuration interface,
   wherein the emulator environment interface comprises functionality to transfer information necessary for compilation of the application,
   wherein the emulator configuration interface is configured to change the appearance and behavior of the entire wireless-connected device as presented by the emulator based on a user request,
   wherein the emulator configuration interface is generated using the emulator environment interface,
   wherein the emulator executes the application,
   wherein the entire wireless-connected device comprises:
      an input device;
      an output device; and
      a processor configured to accept an input from the input device, process the input, and send a result to the output device based on the application; and
   a display for the emulator to accept user input.

2. The apparatus of claim 1, wherein the module is included in an Integrated Development Environment.

3. The apparatus of claim 1, further comprising:
   an additional emulator for an additional wireless-connected device.

4. The apparatus of claim 1, wherein the module is designed to allow creation and packaging of the application with a plurality of profiles without modification of the module.

5. An apparatus for facilitating development of an application for an entire wireless-connected device, comprising:
   a module integrated with an emulator of the entire wireless-connected device using an emulator environment interface and an emulator configuration interface,
   wherein the emulator environment interface comprises functionality to transfer information necessary for compilation of the application,
   wherein the emulator configuration interface is configured to change the appearance and behavior of the entire wireless-connected device as presented by the emulator based on a user request,
   wherein the emulator configuration interface is generated using the emulator environment interface;
   means for executing the application on the emulator of the entire wireless-connected device;
   means for creating and packaging the application with a plurality of profiles without modification of the module; and means for displaying the emulator to accept user input,
   wherein the entire wireless-connected device comprises:
      an input device;
      an output device; and
      a processor configured to accept an input from the input device, process the input, and send a result to the output device based on the application.

6. The apparatus of claim 5, wherein the module is included in an Integrated Development Environment.

7. The apparatus of claim 5, wherein the module comprises a plurality of development tools used in the creation of the application executed on an integrated emulator of the entire wireless-connected device.

8. The apparatus of claim 5, wherein the module is integrated with a plurality of emulators for a plurality of different wireless-connected devices.

9. A computer system for facilitating development of an application for an entire wireless-connected device, comprising:
   a storage element comprising a module;
   a plurality of development tools stored in the module;
   a first processor and a first input device creating the application using the module; and
   an emulator integrated with the module using an emulator environment interface and an emulator configuration interface,
   wherein the emulator environment interface comprises functionality to transfer information necessary for compilation of the application,
   wherein the emulator configuration interface is configured to change the appearance and behavior of the entire wireless-connected device as presented by the emulator based on a user request;
   wherein the emulator configuration interface is generated using the emulator environment interface,
   wherein the first processor is used to execute the application on the emulator of the entire wireless-connected device,
   wherein the module is designed to allow creation and packaging of the application with a plurality of profiles without modification of the module,
   wherein the entire wireless-connected device comprises:
      a second input device;
      an output device; and
      a second processor configured to accept an input from the second input device, process the input, and send a result to the output device based on the application.

10. The system of claim 9, wherein the module is included in an Integrated Development Environment.

11. The system of claim 9, further comprising:
an additional emulator for an additional wireless-connected device.

12. A method of facilitating development of an application for a wire less-connected device, comprising:
combining, in a module, a plurality of development tools used in the creation of the application;
integrating the module with an emulator of the entire wireless-connected device using an emulator environment interface and an emulator configuration interface,
wherein the emulator environment interface comprises functionality to transfer information necessary for compilation of the application,
wherein the emulator configuration interface is configured to change the appearance and behavior of the entire wireless-connected device as presented by the emulator based on a user request,
wherein the emulator configuration interface is generated using the emulator environment interface;
integrating the module into an Integrated Development Environment; using the emulator to execute the application developed using the module within the Integrated Development Environment; and displaying the emulator to accept user input.

13. The method of claim 12, further comprising:
using a plurality of emulators for a plurality of different wireless-connected devices.

14. The method of claim 12, wherein use of the emulator is concurrent with the application created using the module.

15. The method of claim 12, wherein integrating the module comprises creating and packaging the application with a plurality of profiles without modification of the module.

16. The method of claim 12, further comprising:
using the emulator to execute the application developed using the module; and
using an additional emulator for a different wireless-connected device to execute the application.

17. The method of claim 12, wherein the emulator and the Integrated Development Environment execute on a single virtual machine.

18. A method of installing a module used for the development of an application for a wireless-connected device executed on an emulator, comprising:
installing an Integrated Development Environment;
integrating the module into the Integrated Development Environment,
wherein the module is used for developing the application for the wireless-connected device,
wherein the module is integrated with the emulator using an emulator environment interface and an emulator configuration interface,
wherein the emulator environment interface comprises functionality to transfer information necessary for compilation of the application,
wherein the emulator configuration interface is configured to change the appearance and behavior of the entire wireless-connected device as presented by the emulator based on a user request,
wherein the emulator configuration interface is generated using the emulator environment interface,
wherein the application is executed on the emulator configured to emulate the wireless-connected device, and
wherein the emulator emulates the entire wireless-connected device;
installing an emulator configuration file;
installing a plurality of original equipment manufacturer files and templates;
installing a parser database;
starting the Integrated Development Environment; and displaying the emulator to accept user input.

19. The method of claim 18, wherein the emulator and the Integrated Development Environment execute on a single virtual machine.

* * * * *